(12) United States Patent
Huang et al.

(10) Patent No.: US 8,746,910 B2
(45) Date of Patent: Jun. 10, 2014

(54) BACKPLANE, BACKLIGHT MODULE AND LCD DEVICE

(75) Inventors: Chong Huang, Shenzhen (CN); Yicheng Kuo, Shenzhen (CN); Yuchun Hsiao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 264 days.

(21) Appl. No.: 13/375,980

(22) PCT Filed: Nov. 30, 2011

(86) PCT No.: PCT/CN2011/083203
§ 371 (c)(1),
(2), (4) Date: Dec. 2, 2011

(87) PCT Pub. No.: WO2013/071648
PCT Pub. Date: May 23, 2013

(65) Prior Publication Data
US 2013/0128551 A1   May 23, 2013

(30) Foreign Application Priority Data
Nov. 18, 2011  (CN) .......................... 2011 1 0369611

(51) Int. Cl.
*G09F 13/04*      (2006.01)

(52) U.S. Cl.
USPC ........................................ 362/97.2; 362/97.1

(58) Field of Classification Search
USPC ................ 362/97.1–97.3, 640, 647, 396, 432
See application file for complete search history.

(56) References Cited

U.S. PATENT DOCUMENTS 3,096,033 A * 7/1963 Franck et al. ................. 362/330
7,859,608 B2  12/2010 Fukuda

* cited by examiner

*Primary Examiner* — Vip Patel
(74) *Attorney, Agent, or Firm* — IPro, Inc.; Na Xu

(57) ABSTRACT

The present invention discloses a backplane, a backlight module and an LCD device. A backplane, comprising a plurality of ribs which intersect vertically and horizontally to form a plurality of meshes. In the present invention, because ribs are adopted as basic members of the backplane and the comprehensively intersected ribs form the meshes, all components and parts of the backplane module required to be fixed to the backplane can be fixed to the meshes. The ribs are standard and universal; the meshes formed by the ribs are arranged on the whole backplane and can absolutely satisfy the fixation needs of the components and the parts of different positions and different installation dimensions; therefore, for backplanes of different dimensions, as long as the ribs of different lengths are selected, a standard and universal backplane, a backlight module and an LCD device can be formed.

23 Claims, 4 Drawing Sheets

BACKPLANE, BACKLIGHT MODULE AND LCD DEVICE

TECHNICAL FIELD

The present invention relates to the field of liquid crystal displays, and more particularly to a backplane, a backlight module and an LCD device.

BACKGROUND

An LCD device includes an LCD panel and a backlight module, wherein the bottom of the backlight module is provided with a backplane used for sealing the module and fixing a component in the module. In the existing backplanes, integral backplanes are used and are integrally formed in the mode of metal stamping or plastic injection, causing heavy products and high material cost of the products. For large-size backplanes, because larger stamping equipment is needed, the cost is higher, and because the corresponding die size is large and the structure is complicated, the die cost is also very high. With increasingly fierce market competition, it is more and more important to effectively reduce the design cost. As a result, the key research direction of each designer lies in saving the material cost and simplifying the assembly technology.

In addition, because different backlight modules have different component sizes and installing positions, the integral backplane cannot achieve standardized design, and has poor universality.

SUMMARY

The aim of the present invention is to provide a standard and universal backplane, a backlight module and an LCD device.

The aim of the present invention is achieved by the following technical schemes.

A backplane, comprising a plurality of ribs which intersect vertically and horizontally to form a plurality of meshes.

Preferably, the edge of the backplane is provided with a frame which is clamped and fixed to the meshes. The strength of the frame is larger than the strength of the ribs; the integral strength of the backplane can be enhanced by fixing the frame to the meshes.

Preferably, at least two central brackets with a reinforcing action are arranged in the middle of the frame; the central brackets are clamped and fixed on the meshes; the end parts of the central brackets are fixed to the frame. The strength of the frame can be further enhanced by adding the central brackets.

Preferably, the ribs are rigid ribs which form a plurality of meshes with constant pore size. The rigid ribs have high strength, difficult deformation and good weight capacity. Moreover, the sizes of the meshes are constant; the locking piece is fixed to the meshes, causing high connection strength.

Preferably, the ribs are elastic ribs which form a plurality of meshes with variable pore sizes. The elastic ribs have good tenacity, and are suitable for locking pieces of different sizes and shapes within limits, with good universality.

Preferably, the vertical and horizontal ribs intersect. The intersection can enhance the strength of the backplane; moreover, the intersection points are not fixedly connected; therefore, the sizes of the meshes have a certain regulation range; the meshes are suitable for locking pieces of different sizes and shapes, with good universality.

Preferably, the multiple ribs are fixedly connected in the intersection positions. After the ribs are fixedly connected in the intersection positions, the sizes of the meshes are constant; the locking piece is fixed to the meshes, causing high connection strength.

A backlight module, comprising: the backplane; the meshes of the backplane are provided with one or a plurality of functional clamping pieces.

Preferably, the functional clamping pieces comprise one or more locking pieces and radiating pieces. It is a concrete form of the functional clamping pieces. The locking pieces are used for fixing components such as PCBs; the radiating pieces are used for radiating heat from a lamp source.

Preferably, the functional clamping pieces together with the clamping parts for fixing the meshes are standard parts. The standard clamping parts can enhance the universality and facilitate cost reduction and the enhancement of production efficiency.

An LCD device, comprising: a backlight module.

In the present invention, because ribs are adopted as basic members of the backplane and the comprehensively intersected ribs form the meshes, all components and parts of the backplane module required to be fixed to the backplane can be fixed to the meshes. The ribs are standard and universal; the meshes formed by the ribs are arranged on the whole backplane and can absolutely satisfy the fixation needs of the components and the parts of different positions and different installation dimensions; therefore, for backplanes of different dimensions, as long as the ribs of different lengths are selected, a standard and universal backplane, a backlight module and an LCD device can be formed.

Figure 1:
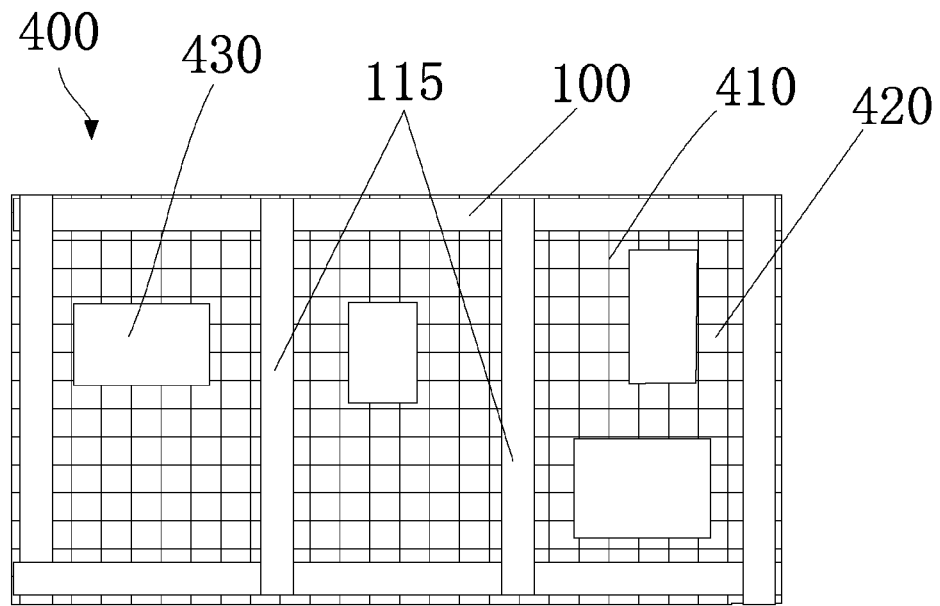
FIG. 1 is a schematic diagram of a backplane of the present invention.

Wherein: 100. frame; 111. upper bracket; 112. right bracket; 113. lower bracket; 114. left bracket; 115. central bracket; 130. reinforcement; 131. connecting part; 300. locking piece; 310. conical peak; 320. buckling claw; 330. threaded hole; 340. rivet; 350. screw; 400. backplane; 410. rib; 420. mesh; 430. functional clamping piece; 500. PCB.

DETAILED DESCRIPTION

The present invention will further be described in detail in accordance with the figures and the preferred examples.

An LCD device, comprising: an LCD panel and a backlight module, wherein the bottom of the backlight module is provided with a backplane 400, and a locking piece 300, a heat-sink plate and other functional clamping pieces 430 which are fixed to the backplane 400. The backplane 400 comprises a plurality of ribs 410 which intersect vertically and horizontally to form a plurality of meshes 420; the PCBs 500 and other components of the backlight module are fixed to the backplane 400 through the meshes 420. Certainly, in order to enhance the strength of the backplane 400, the edge of the backplane 400 can be provided with a frame 100; the frame 100 can be integrally formed or formed by joining an upper bracket 111, a lower bracket 113, a left bracket 114 and a right bracket 112 which are placed end to end; the joining backplane can be constructed through universal sections, with high universality and lower cost.

Further, central brackets 115 with a reinforcing action can also be arranged in the middle of the frame 100, causing higher strength of the backplane 400. The frame 100 and the central brackets 115 are fixed to the backplane 400 through the meshes 420. Angular reinforcements 130 can be added in the joining positions, and are arranged in four angular positions of the frame; each reinforcement 130 comprises two connecting parts 131 which are used for connecting and fixing with the brackets in the frame. The reinforcements 130 are integrally formed, have high strength, and can enhance the joining strength; moreover, the connecting parts 131 can be standardized so that the brackets can be made into standard sections; the brackets are only cut according to backplanes of different sizes, with high universality. The reinforcements 130 can also be made into clamping type reinforcements to be fixed to the meshes 420.

The multiple ribs 410 can be rigid ribs 410 which form a plurality of meshes 420 with constant pore size. The ribs 410 can also be elastic ribs 410 which form a plurality of meshes 420 with variable pore sizes.

The multiple ribs 410 can be integrally formed or fixedly connected in the intersection to form fixed grids for enhancing the strength of the grids. Certainly, the strength of the grids can also be enhanced by the mode that the vertical ribs 410 and the horizontal ribs 410 intersect; moreover, the sizes of the grids can have a certain adjustment space. The vertical ribs 410 and the horizontal ribs 410 can be uniformly fixed to one side of the backplane 400 or respectively fixed to both sides of the backplane 400.

Figure 2:
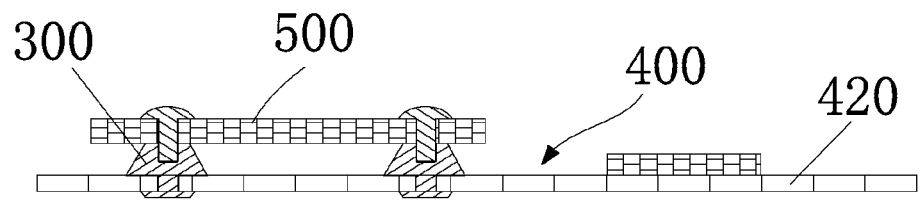
FIG. 2 is a schematic diagram of fixing PCBs through a backplane in the present invention.
Figure 3:
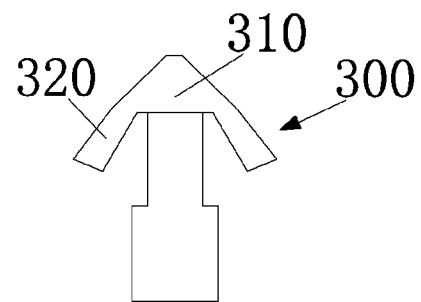
FIG. 3 is a schematic diagram of the first locking piece in the example 1 of the present invention.
Figure 4:
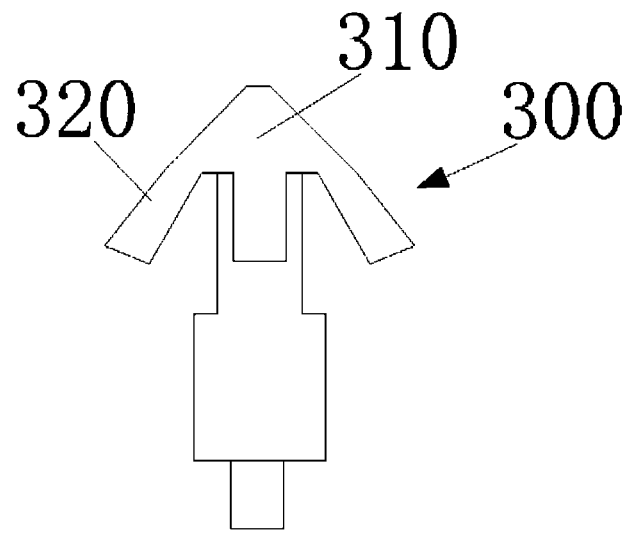
FIG. 4 is a schematic diagram of the second locking piece in the example 1 of the present invention.
Figure 5:
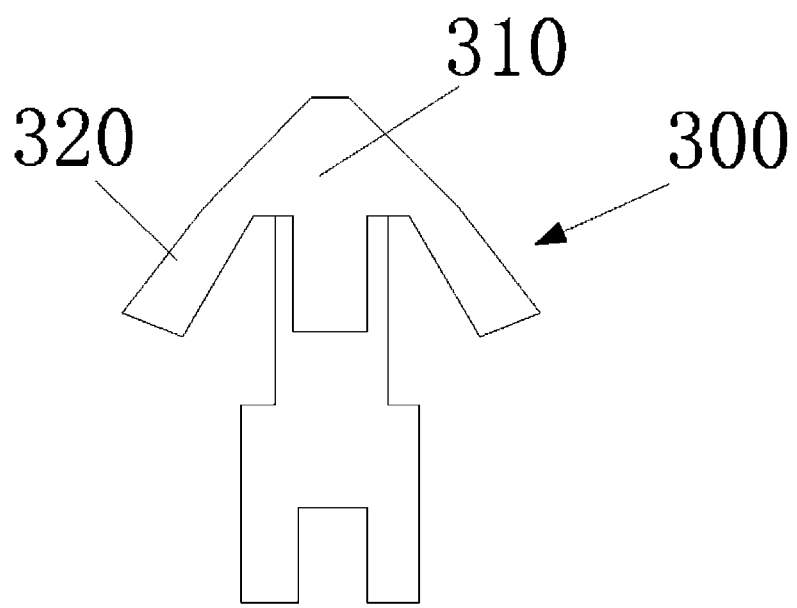
FIG. 5 is a schematic diagram of the third locking piece in the example 1 of the present invention.
Figure 6:
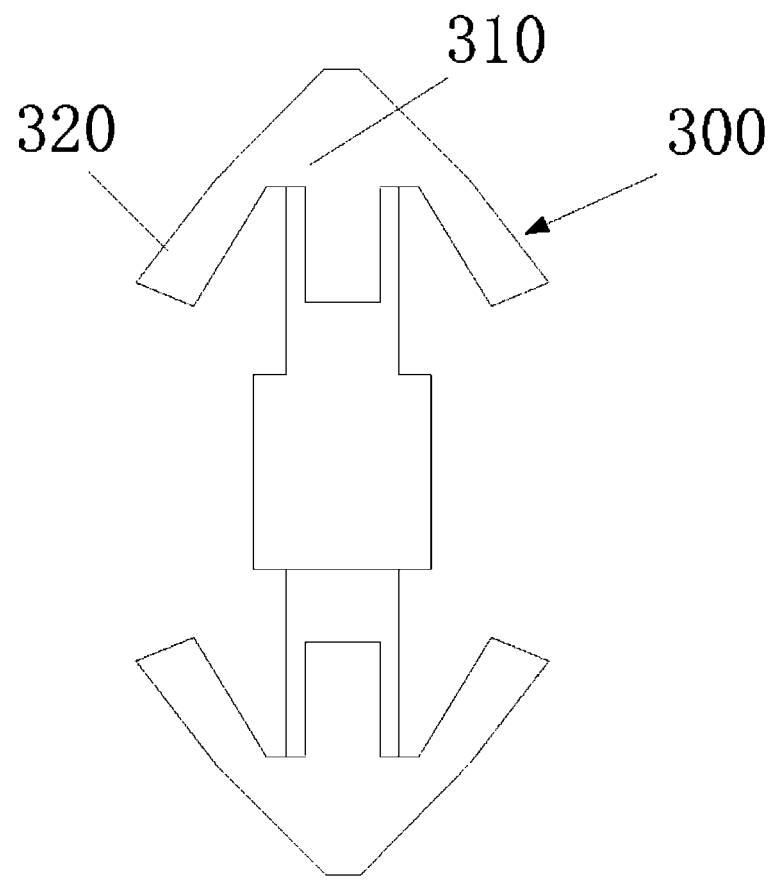
FIG. 6 is a schematic diagram of the fourth locking piece in the example 1 of the present invention.

The functional clamping pieces 430 are fixed to the meshes 420 through the clamping parts; the clamping parts are standard parts so as to enhance the universality, reduce the cost and enhance the production efficiency. As shown in FIG. 2, taking the fixation of PCBs as an example, the locking piece 300 is arranged in the area where a circuit board needs to be fixed-in case of hillocks, the bottoms of the hillocks together with the clamping parts for fixing the meshes can adopt the forms of standardized riveting columns, screws, threaded holes and the like; the tops of the hillocks are fixedly connected with the PCBs 500.

EXAMPLE 1

As shown in FIGS. 3 to 6, the top of the locking piece 300 fixed with the PCBs is provided with a conical peak 310; more than two elastic buckling claws 320 extend out of the bottom of the peak to form a clamping structure for fixing the PCBs 500; the locking piece 300 can be integrally formed by plastics.

The locking piece 300 and the backplane are provided with a fixed structure used for fixing the locking piece 300 to the backplane; the fixed structure can be in any form of riveting columns, screws or threaded holes, or the same clamping structure as the top; correspondingly, the backplane is provided with installing holes used for fixing the locking piece 300 which is installed on the backplane through the installing holes. The root of the locking piece 300 can be a plane which is unfixed with the backplane and only fixed with the PCBs 500 so as to perform a pure supporting action on the PCBs.

EXAMPLE 2

Figure 7:
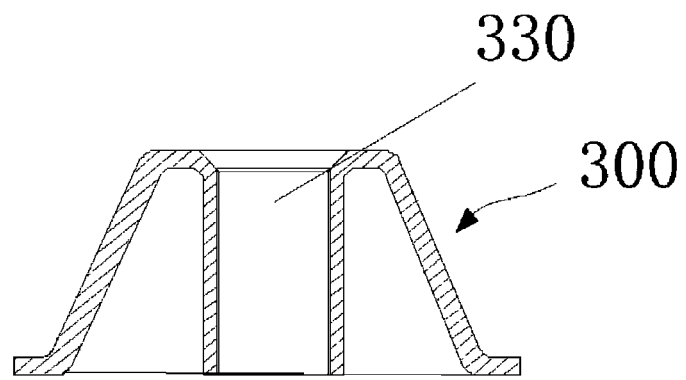
FIG. 7 is a schematic diagram of the first locking piece in the example 2 of the present invention.
Figure 8:
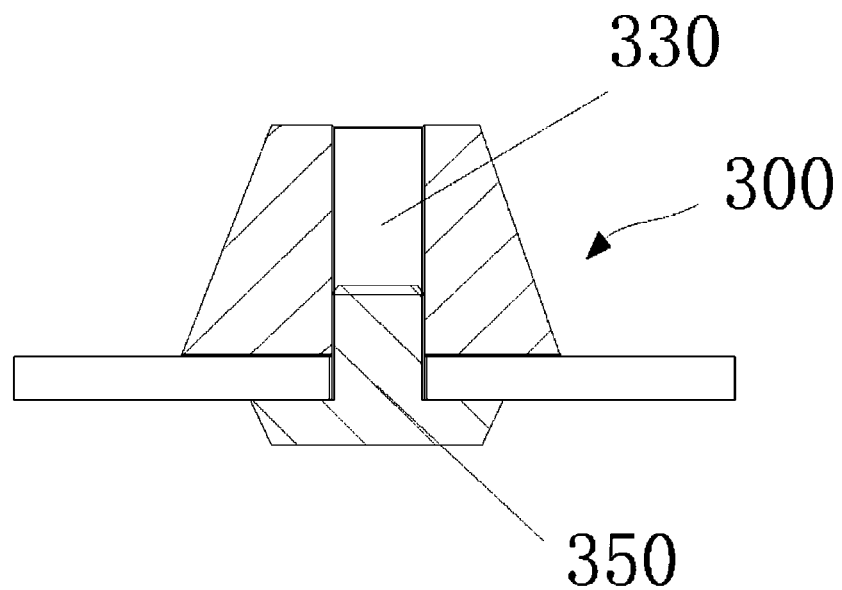
FIG. 8 is a schematic diagram of the second locking piece in the example 2 of the present invention.
Figure 9:
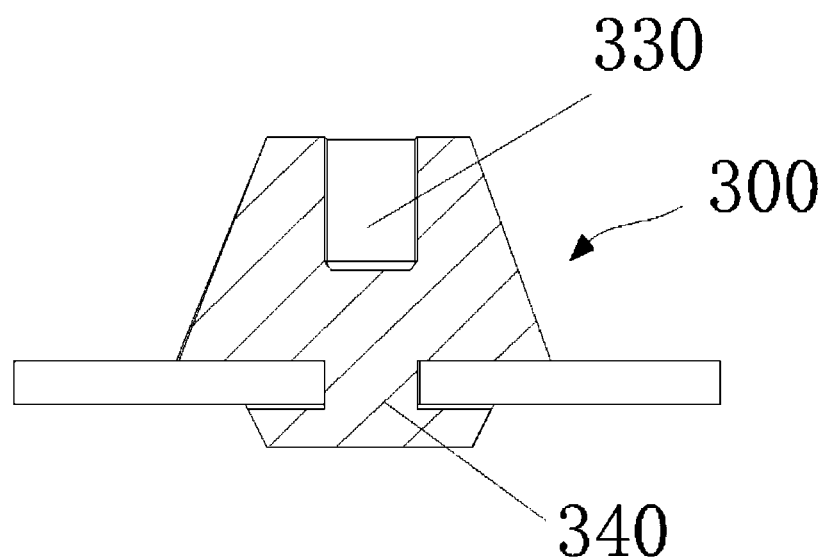
FIG. 9 is a schematic diagram of the third locking piece in the example 2 of the present invention.

FIGS. 7 to 9 show another form of the locking piece 300— the hillocks 800 existing as independent parts; the hillocks 800 are not formed on the backplane in producing the backplane but installed in the relevant positions of the backplane 400 in needing to use the hillocks so as to achieve the purpose of flexibly using the hillocks to locate the components of various dimensions of PCBs and the like.

As shown in FIG. 7, the hillock has a threaded hole 330 used for installing and fixing components of PCBs 500 and the like, and the threaded hole 330 always penetrates through the independent hillock. Thus, the independent hillock can be fixed on the backplane 400 from the lower part through a screw 350, and can fix the PCB 500 from the upper part. Accordingly, the backplane 400 is provided with hillock installing holes, such as through holes or chutes, of which the size is corresponding to that of the threaded hole 330 of the hillock, so that the hillock can be fixed on the backplane 400. Similarly, the PCB 500, the hillock and the backplane are fixed by using only one screw matching with a nut.

As shown in FIG. 8, the PCB 500 can be fixed to the hillock through a screw 350; the hillock is fixed to the backplane through the screw 350 and a nut 812.

In order to facilitate installation, the hillock can be set into a similar structure to the rivet, namely the rivet and the hillock are integrally formed; as shown in FIG. 9, the connection of the lower part of the hillock with the backplane 400 is in a riveting form, namely the hillock is riveted to the backplane 400 through the rivet 340. The riveting mode is quicker than the screwing mode, can be accomplished by machinery so that the production efficiency can be improved.

The hillock is fixed on the backplane 400 through the rivet 340, and then the PCB 500 is fixed on the hillock through the screw 350 so that the PCB 500 is locked.

To save material and facilitate processing, the hillock can be formed by directly stamping a panel. As shown in FIG. 10, the inside of the hillock is of a hollow structure, and the whole hillock is made of panel material, which saves material and facilitates production.

Certainly, the shape of the independent hillock in the example is not limited to the conical section shape shown in the figure; other shapes such as square can also achieve the corresponding purpose.

In the example, corresponding hillocks are arranged in corresponding positions in accordance with the size of the PCB 500 of the backlight module; meanwhile, the number of corresponding hillocks is set according to the components of PCBs 500 of different numbers.

The present invention is described in detail in accordance with the above contents with the specific preferred examples. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

We claim:
1. A backplane, comprising a plurality of ribs which intersect vertically and horizontally to form a plurality of meshes, a plurality of locking pieces arranged in an area where a circuit board fixed, wherein a bottom of each locking piece comprises a clamping part fixed in one mesh, and a top of each locking piece is fixedly connected with the circuit board.

2. The backplane of claim 1, wherein the edge of said backplane is provided with a frame which is clamped and fixed to the meshes.

3. The backplane of claim 2, wherein at least two middle brackets with a reinforcing action are arranged in the middle of the frame; said middle brackets are clamped and fixed on said meshes; the end parts of the middle brackets are fixed to the frame.

4. The backplane of claim 1, wherein said ribs are rigid ribs which form a plurality of meshes with constant pore size.

5. The backplane of claim 1, wherein said ribs are elastic ribs which form a plurality of meshes with variable pore sizes.

6. The backplane of claim 1, wherein said multiple ribs are fixedly connected in the intersection positions.

7. The backplane of claim 1, wherein a top of the locking pieces fixed with the circuit boards is provided with a conical peak; more than two elastic buckling claws extend out of the bottom of the peak to form a clamping structure for fixing the circuit boards.

8. A backlight module, comprising: a backplane; the backplane comprises a plurality of ribs which intersect vertically and horizontally to form a plurality of meshes; the meshes of said backplane are provided with one or a plurality of functional clamping pieces, a plurality of locking pieces arranged in an area where a circuit board fixed, wherein a bottom of each locking piece comprises a clamping part fixed in one mesh, and a top of each locking piece is fixedly connected with the circuit board.

9. The backlight module of claim 8, wherein the edge of the backplane is provided with a frame which is clamped and fixed to the meshes.

10. The backlight module of claim 9, wherein at least two middle brackets with a reinforcing action are arranged in the middle of the frame; said middle brackets are clamped and fixed on said meshes; the end parts of the middle brackets are fixed to the frame.

11. The backlight module of claim 8, wherein said ribs are rigid ribs which form a plurality of meshes with constant pore size.

12. The backlight module of claim 8, wherein said ribs are elastic ribs which form a plurality of meshes with variable pore sizes.

13. The backlight module of claim 8, wherein multiple ribs are fixedly connected in the intersection positions.

14. The backlight module of claim 13, wherein said functional clamping pieces comprise one or more of locking pieces and radiating pieces.

15. The backlight module of claim 13, wherein said functional clamping pieces together with the clamping parts for fixing the meshes are standard parts.

16. The backlight module of claim 8, wherein a top of the locking pieces fixed with the circuit boards is provided with a conical peak; more than two elastic buckling claws extend out of the bottom of the peak to form a clamping structure for fixing the circuit boards.

17. An LCD device, comprising: a backlight module; said backlight module comprises a backplane which comprises a plurality of ribs; said ribs vertically and horizontally intersect to form a plurality of meshes; the meshes of said backplane are provided with one or a plurality of functional clamping pieces, a plurality of locking pieces arranged in an area where a circuit board fixed, wherein a bottom of each locking piece comprises a clamping part fixed in one mesh, and a top of each locking piece is fixedly connected with the circuit board.

18. The LCD device of claim 17, wherein the edge of said backplane is provided with a frame which is clamped and fixed to the meshes.

19. The LCD device of claim 18, wherein at least two middle brackets with a reinforcing action are arranged in the middle of said frame; said middle brackets are clamped and fixed on said meshes; the end parts of the middle brackets are fixed to the frame.

20. The LCD device of claim 17, wherein said ribs are rigid ribs which form a plurality of meshes with constant pore size.

21. The LCD device of claim 17, wherein said ribs are elastic ribs which form a plurality of meshes with variable pore sizes.

22. The LCD device of claim 17, wherein said ribs are fixedly connected in the intersection positions.

23. The LCD device of claim 17, wherein a top of the locking pieces fixed with the circuit boards is provided with a conical peak; more than two elastic buckling claws extend out of the bottom of the peak to form a clamping structure for fixing the circuit boards.

* * * * *